US010870580B2

(12) United States Patent
Won et al.

(10) Patent No.: US 10,870,580 B2
(45) Date of Patent: Dec. 22, 2020

(54) POLYIMIDE FILM FOR GRAPHITE SHEET, GRAPHITE SHEET PREPARED BY USING THE SAME AND METHOD FOR PREPARING GRAPHITE SHEET

(71) Applicant: PI Advanced Materials Co., Ltd., Chungcheongbuk-do (KR)

(72) Inventors: Dong Young Won, Seoul (KR); Kyung Su Kim, Seoul (KR); Sung Il Cho, Yongin-si (KR); Jeong Yeul Choi, Anyang-si (KR)

(73) Assignee: PI Advanced Materials Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 16/428,839

(22) Filed: May 31, 2019

(65) Prior Publication Data
US 2019/0284054 A1 Sep. 19, 2019

Related U.S. Application Data

(63) Continuation of application No. 15/973,338, filed on May 7, 2018, now Pat. No. 10,351,432.

(30) Foreign Application Priority Data

Jan. 30, 2018 (KR) .................. 10-2018-0011176

(51) Int. Cl.
| | | |
|---|---|---|
| *C01B 32/205* | (2017.01) | |
| *C08G 73/10* | (2006.01) | |
| *C09K 5/14* | (2006.01) | |
| *C08J 5/18* | (2006.01) | |

(52) U.S. Cl.
CPC ........ *C01B 32/205* (2017.08); *C08G 73/1003* (2013.01); *C08G 73/1071* (2013.01); *C08J 5/18* (2013.01); *C09K 5/14* (2013.01); *C01P 2006/32* (2013.01); *C08J 2379/08* (2013.01)

(58) Field of Classification Search
CPC .......... C08G 73/1003; C08J 5/18; C09K 5/14; C01B 2006/32; C07J 2379/08
See application file for complete search history.

(56) References Cited

U.S. PATENT DOCUMENTS

| | | | | |
|---|---|---|---|---|
| 2011/0084419 A1* | 4/2011 | Uekido | .................. | B29C 41/24 |
| | | | | 264/216 |
| 2017/0267908 A1* | 9/2017 | Murakami | ............... | G21K 5/08 |

FOREIGN PATENT DOCUMENTS

| | | |
|---|---|---|
| EP | 0 449 312 A2 | 10/1991 |
| JP | 6034662 B2 | 11/2016 |
| JP | 6121168 B2 | 4/2017 |

(Continued)

OTHER PUBLICATIONS

Japanese Office Action dated Jun. 22, 2018, for Japanese Application No. 2018-091130, 12 pages. (With Machine Translation).

(Continued)

*Primary Examiner* — Richard M Rump
(74) *Attorney, Agent, or Firm* — Seed IP Law Group LLP

(57) ABSTRACT

The present disclosure provides a polyimide film prepared from a precursor composition containing a polyamic acid and an organic solvent and having a value of (first FWHM−second FWHM)/(first FWHM+second FWHM) which is less than 0.4, a graphite sheet prepared from the polyimide film, and a method for preparing a graphite sheet.

15 Claims, 2 Drawing Sheets

(56) References Cited

FOREIGN PATENT DOCUMENTS

| JP | 6174916 B2 | 8/2017 | |
|---|---|---|---|
| KR | 10-2017-0049912 A | 5/2017 | |
| WO | WO-2016088845 A1 * | 6/2016 | ............... G21K 5/08 |
| WO | 2017/073921 A1 | 5/2017 | |

OTHER PUBLICATIONS

Korean Office Action dated Oct. 4, 2018, for Korean Application No. 10-2018-0011176, 14 pages. (With English Translation).

* cited by examiner

POLYIMIDE FILM FOR GRAPHITE SHEET, GRAPHITE SHEET PREPARED BY USING THE SAME AND METHOD FOR PREPARING GRAPHITE SHEET

CROSS-REFERENCE TO RELATED APPLICATIONS

This application is a continuation of U.S. application Ser. No. 15/973,338, filed May 7, 2018 (now allowed), which claims the benefit under 35 U.S.C. § 119(b) of Korean Patent Application No. 10-2018-0011176, filed on Jan. 30, 2018 which applications are incorporated herein by reference in its entirety.

TECHNICAL FIELD

The present disclosure relates to a polyimide film for a graphite sheet, a graphite sheet prepared using the same, and method for preparing a graphite sheet.

BACKGROUND

Recently, electronic devices are gradually becoming lighter, smaller, thinner and highly integrated in its structure. As a result, many problems attributable to a heat load have been caused due to the increase in heat generation amount per unit volume. Representative problems include, for example, problems directly affecting the performance of an electronic device, such as a decrease in operation speed of a semiconductor due to a heat load of an electronic device, a shortening of lifespan of a battery due to battery deterioration, and the like.

For this reason, the effective heat dissipation in an electronic device is becoming one of very important tasks.

As a heat dissipation means used in an electronic device, graphite having a superior thermal conductivity draws attention. Among them, an artificial graphite sheet which can be easily processed into a sheet form and has a thermal conductivity of about 2 to 7 times higher than the thermal conductivity of copper or aluminum is in the spotlight.

Such an artificial graphite sheet can be obtained through a carbonization process and a graphitization process of a polymer. Among the polymers, a heat-resistant polymer capable of withstanding a temperature of about 400 degrees C. or higher can be used as a graphite precursor. A representative example of such a heat-resistant polymer is polyimide (PI).

Polyimide, which is based on a rigid aromatic main chain and an imide ring having an excellent chemical stability, is a polymer material having the highest level of heat resistance, chemical resistance, electrical insulation and weather resistance among organic materials. Polyimide is known as an optimal graphite precursor because polyimide makes it possible to achieve excellent yield, crystallinity and thermal conductivity in the preparation of an artificial graphite sheet.

In general, the physical properties of an artificial graphite sheet are known to be greatly affected by the physical properties of polyimide as a graphite precursor. Thus, the modification of polyimide has been actively studied in order to improve the physical properties of the artificial graphite sheet. In particular, extensive research is underway to improve the thermal conductivity of the artificial graphite sheet.

Nevertheless, there is no clear result in the development of an artificial graphite sheet having a very high thermal conductivity capable of remarkably improving the performance of an electronic device due to heat dissipation and a polyimide capable of realizing the artificial graphite sheet.

Therefore, it is necessary to develop an artificial graphite sheet having a desired thermal conductivity and a polyimide capable of realizing the artificial graphite sheet.

SUMMARY

It is an object of the present disclosure to provide a novel polyimide film and a graphite sheet prepared by the polyimide film.

According to one aspect of the present disclosure, the diffraction peaks of (010) plane and (102) plane according to the XRD analysis among the crystal planes of a polyimide film are disclosed as essential factors required for realizing a graphite sheet having a high thermal conductivity.

In particular, in the diffraction peaks of (010) plane and (102) plane, the polyimide film may include the relationship between FWHMs(full width at half maximum) thereof as an important factor for realizing a graphite sheet having an excellent thermal conductivity. Specifically, the polyimide film may include, as the important factor, a value of the following Formula 1 which is established to calculate the relationship between FWHMs as a quantitative value. When the calculated value satisfies a specific numerical range in the present disclosure, the polyimide film may be desirable for the realization of a graphite sheet having a significantly excellent thermal conductivity.

According to another aspect of the present disclosure, a method for preparing a graphite sheet may include a value of Formula 1 as an important factor. A graphite sheet having a desired high thermal conductivity can be prepared using a polyimide film in which a value of Formula 1 falls with the above numerical range.

Accordingly, the present disclosure has a practical purpose in providing a specific embodiment thereof.

The present disclosure focuses on a polyimide film in which a value of Formula 1 with respect to the relationship between FWHMs is less than 0.4. Such a polyimide film and a method for preparing a graphite sheet using the polyimide film may make it possible to realize a graphite sheet having an extremely high thermal conductivity of 1400 W/m·K or more.

Accordingly, the present disclosure provides a polyimide film which is prepared from a precursor composition including a polyamic acid and an organic solvent and in which a value of the following Formula 1 is less than 0.4, and a graphite sheet derived from the polyimide film.

$$\text{(first FWHM−second FWHM)/(first FWHM+second FWHM)} \qquad \text{Formula 1}$$

The present disclosure also provides a method for preparing a graphite sheet. Specifically, the method may include: preparing a polyimide film having a value of Formula 1 is less than 0.4; carbonizing the polyimide film; and obtaining a graphite sheet by graphitizing the carbonized polyimide film.

Hereinafter, embodiments of the present disclosure will be described in more detail in the order of a "polyimide film", a "method for preparing a graphite sheet" and a "graphite sheet" according to the present invention.

Terms and words used in the present specification and the claims should not be construed as being limited to ordinary or lexical meanings, but should be construed as meanings and concepts consistent with the technical idea of the present disclosure based on the principle that an inventor may appropriately define the concepts of terms to describe its own invention in the best way.

Therefore, the configurations of the embodiments disclosed herein are nothing more than the most preferred embodiments of the present disclosure and are not intended to represent all of the technical ideas of the present disclosure. It is to be understood that various equivalents and modifications of these configuration may exist.

As used herein, singular forms include plural forms unless the context clearly dictates otherwise. In this specification, the terms "comprising", "including", "having" and the like are intended to indicate the presence of features, numbers, steps, elements or the combinations thereof, and are not intended to preclude the presence or the possibility of addition of one or more other features, numbers, steps, elements or the combinations thereof.

As used herein, the term "dianhydride" is intended to encompass its precursors or derivatives, which may not technically be dianhydride but may react with diamine to form a polyamic acid. The polyamic acid may be converted into polyimide again.

As used herein, the term "diamine" is intended to encompass its precursors or derivatives, which may not technically be diamine but may react with dianhydride to form a polyamic acid. The polyamic acid may be converted into polyimide again.

In this specification, when an amount, a concentration, or other value or parameter is given as an enumeration of a range, a preferred range, or a preferred upper limit value and a preferred lower limit value, it is understood that the range specifically discloses all ranges defined by a pair of an arbitrary upper range limit value or a preferred value and an arbitrary lower range limit value or a preferred value regardless of whether the range is separately disclosed. When a range of numerical values is mentioned in this specification, unless otherwise stated, the range is intended to encompass the endpoints thereof and all the integers and fractions falling within the range. The scope of the present disclosure is intended not to be limited to the specific values mentioned when defining the scope.

Polyimide Film

The polyimide film according to the present disclosure may be prepared from a precursor composition including a polyamic acid and an organic solvent. The details of the polyimide film will be described in detail through the following non-limiting embodiments.

<Features of Polyimide Film>

In one specific embodiment, the polyimide film has a value from the following Formula 1 which may fall within a numerical value range of less than 0.4, specifically 0.01 or more and 0.37 or less, more specifically 0.02 or more and 0.16 or less, particularly specifically 0.03 or more and 0.09 or less. In the case of the polyimide film of the present disclosure, the graphite sheet prepared using the polyimide film may exhibit a high thermal conductivity.

(first FWHM−second FWHM)/(first FWHM+second FWHM)          Formula 1

In this regard, when a diffraction peak of (010) plane according to XRD analysis of the polyimide film is in the form of a single peak, the first FWHM may indicate a FWHM of the single peak; and when the diffraction peak of (010) plane is in the form of a plurality of single peaks or in the form of a plurality of single peaks overlapped with each other, the first FWHM may indicate an average of individual FWHMs of the single peaks.

When a diffraction peak of (102) plane according to XRD analysis of the polyimide film is in the form of a single peak, the second FWHM may indicate a FWHM of the single peak; and when the diffraction peak of (102) plane is in the form of a plurality of single peaks or in the form of a plurality of single peaks overlapped with each other, the second FWHM may indicate an average of individual FWHMs of the single peaks.

It is believed in the present disclosure that among the crystal planes of the polyimide film, the diffraction peak of (010) plane and the diffraction peak of (102) plane are closely related to the overall orientation of the film. In the case where the orientation of the polyimide film is excellent, a high thermal conductivity may be exhibited in the graphite sheet derived from the polyimide film.

Generally, the larger the width of the diffraction peak, the lower the degree of crystallinity (or the orientation). The smaller the width of the diffraction peak, the higher the degree of crystallinity (or the orientation). The quantitative analysis of the diffraction peak width may be determined based on a FWHM of a peak.

However, even if each of the first FWHM and the second FWHM for the diffraction peak of (010) plane and the diffraction peak of (102) plane is relatively small, when the difference between the first FWHM and the second FWHM is too large or too small, the first FWHM and the second FWHM may deviate from the numerical value range of the present disclosure related to the value of Formula 1. In the case of preparing a graphite sheet using a conventional polyimide film corresponding to this case, a high thermal conductivity may not be exhibited.

In contrast, even if each of the first FWHM and the second FWHM for the diffraction peak of (010) plane and the diffraction peak of (102) plane is relatively large, the value of Formula 1 may fall within the numerical value range described above. In this case, the graphite sheet prepared from the polyimide film according to the present disclosure may have a relatively high thermal conductivity.

In other words, in order to achieve a high thermal conductivity in the graphite sheet, it is important that the value of Formula 1 satisfies the numerical value range of the present disclosure while the first FWHM and the second FWHM have appropriate values. This will be clearly demonstrated below. The polyimide film of the present disclosure has the value of Formula 1 which satisfies the numerical value range of the present disclosure. Thus, when a graphite sheet is prepared from the polyimide film, it is possible to realize a graphite sheet having a high thermal conductivity of 1400 W/m·K or more.

Meanwhile, it is considered that the orientation of the polyimide film is related to various conditions such as the type of a monomer, the solid content of a precursor composition, the viscosity, the casting temperature of the polyimide film, the degree of elongation of a film intermediate, and the like. Even if some of these conditions are satisfied, the orientation is not particularly improved, or a high thermal conductivity is not exhibited when preparing a graphite sheet. Surprisingly, however, even if there are some differences in the conditions relating to the orientation, the graphite sheet prepared from the polyimide film having the value of Formula 1 which satisfies the numerical value range of the present disclosure may exhibit a high thermal conductivity. As a result, it can be concluded that the diffraction peak of (010) plane and the diffraction peak of (102) plane are closely related to the orientation.

It is also possible to quantitatively calculate the relationship between the first FWHM and the second FWHM for the diffraction peak of (010) plane and the diffraction peak of (102) plane by Formula 1. It is possible to qualitatively predict the thermal conductivity of the graphite sheet on the basis of whether the calculated value falls within the numerical value range of the present disclosure or not.

It is presumed that the above advantage is due to the relatively advantageous effect of carbon rearrangement during carbonization and graphitization of the polyimide film when the value of Formula 1 falls within the specific numerical value range of the present disclosure.

Further, if it is assumed that the graphitization proceeds substantially simultaneously in the surface layer and the inside of the polyimide film, the polyimide film according to the present disclosure satisfying the above-mentioned specific numerical value range has orientation characteristics suitable for conversion into a graphite sheet. Thus, it is expected that the polyimide film has suitable orientation which assists in forming a graphite structure having a high level of thermal conductivity both in the surface layer and the inside of the polyimide film and in suppressing a phenomenon that a gas generated from the inside of the polyimide film destroys the graphite structure formed in the surface layer.

In one embodiment, the first FWHM may be 35 degrees or more and 80 degrees or less. The second FWHM may be 43% or more and 92% or less, more specifically a value of 49% or more and 92% or less, of the first FWHM.

<Precursor Composition>

In one specific embodiment, the polyamic acid may be prepared by the polymerization reaction of at least one kind of diamine monomers and at least one kind of dianhydride monomers (acid dianhydride).

The dianhydride monomer which can be used for the preparation of the polyamic acid may include pyromellitic dianhydride, 2,3,6,7-naphthalene tetracarboxylic dianhydride, 3,3',4,4'-biphenyl tetracarboxylic dianhydride, 1,2,5,6-naphthalene tetracarboxylic dianhydride, 2,2',3,3'-biphenyl tetracarboxylic dianhydride, 3,3',4,4'-benzophenone tetracarboxylic dianhydride, 2,2-bis(3,4-dicarboxyphenyl) propane dianhydride, 3,4,9,10-perylene tetracarboxylic dianhydride, bis(3,4-(dicarboxyphenyl) propane dianhydride, 1,1-bis(2,3-dicarboxyphenyl) ethane dianhydride, 1,1-bis (2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) ethane dianhydride, oxydiphthalic anhydride, bis(3,4-dicarboxyphenyl) sulfone dianhydride, p-phenylene bis (trimellitic monoester acid anhydride), ethylene bis(trimellitic monoester acid anhydride, bisphenol A bis (trimellitic monoester acid anhydride), and analogues thereof. These substances may be used alone or as a mixture of the substances mixed in an arbitrary ratio.

The diamine which can be used for the preparation of the polyamic acid may include 4,4'-diaminodiphenylpropane, 4,4'-diaminodiphenylmethane, benzidine, 3,3'-dichlorobenzidine, 4,4'-diaminodiphenylsulfide, 3,3'-diaminodiphenylsulfone, 4,4'-diaminodiphenylsulfone, 4,4'-diaminodiphenylether(4,4'-oxydianiline), 3,3'-diaminodiphenylether(3,3'-oxydianiline), 3,4'-diaminodiphenylether(3,4'-oxydianiline), 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene(p-phenylenediamine), 1,3-diaminobenzene, 1,2-diaminobenzene, and analogues thereof. These substances may be used alone or as a mixture of the substances mixed in an arbitrary ratio.

The organic solvent is not particularly limited, and any solvent capable of dissolving the polyamic acid may be used. However, an amide-based solvent is preferable. Specifically, the solvent may be an organic polar solvent and may be an aprotic polar solvent. For example, the solvent may be, but is not limited to, one or more selected from the group consisting of N,N'-dimethylformamide (DMF), N,N'-dimethylacetamide, N-methylpyrrolidone (NMP), gamma-butyrolactone (GBL) and diglyme. If necessary, these substances may be used alone or in combination. In one example, N,N'-dimethylformamide and N,N'-dimethylacetamide may be particularly preferably used as the solvent.

Optionally, the precursor composition may further include fillers such as calcium carbonate, dicalcium phosphate, barium sulfate, and the like.

<Preparation of Polyimide Film>

In one specific embodiment, the precursor composition for the preparation of the polyimide film may satisfy the following conditions (a) to (c):

(a) a viscosity of the precursor composition at 23 degrees C. is from 55,000 cP to 900,000 cP;

(b) a heat treatment temperature for heating and drying the precursor composition after casting the precursor composition is from 150 degrees C. to 200 degrees C.; and (c) a film intermediate derived from the precursor composition is stretched in at least one of a machine direction (MD) and a transverse direction (TD).

Depending on the above conditions, the physical properties of the polyimide film may be changed, and each of the first half width and the second half width may be changed. The significance of the above conditions (a) to (c) will be described below in more detail.

i) Condition (a)

The weight average molecular weight of the polyamic acid contained in the precursor composition may be 240,000 or more, specifically 260,000 or more, and more specifically, 280,000 or more. The use of the polyimide film prepared from the precursor composition may be advantageous for the preparation of a graphite sheet having an excellent thermal conductivity because carbon chains longer and larger than those when weight average molecular weight is less than 240,000 are polymerized.

The weight average molecular weight in the above range may be controlled by adjusting the viscosity of the precursor composition. Specifically, the weight average molecular weight increases in proportion to the viscosity. However, the weight average molecular weight is not linearly proportional to the viscosity but is proportional to the viscosity in a logarithmic form.

That is, even if the viscosity is increased to obtain a polyamic acid having a higher weight average molecular weight, the range in which the weight average molecular weight can increase is limited. If the viscosity is excessively high, when varnish is discharged through a die in a process of casting for preparing a polyimide film, a problem of workability may be caused due to an increase in the pressure inside the die or the like.

In the present disclosure, the polyamic acid may be contained in an amount of 15 to 20% by weight based on the total weight of the precursor composition. The weight average molecular weight in the above range may be achieved by controlling the viscosity in this range.

In this case, the content of the polyamic acid corresponds to the total amount of the dianhydride monomers and the diamine monomers used in the reaction. In other words, the content of the polyamic acid may be referred to as "the solid content of the polyamic acid" present in the precursor composition.

A more preferred range of the viscosity may be 90,000 cP to 300,000 cP, more preferably 100,000 cP to 250,000 cP.

ii) Condition (b)

After casting the precursor composition, as the precursor composition is subjected to a heat treatment at a predetermined temperature conforming to the condition (b), the polyamic acid may be partially cyclized and dehydrated to form imide rings, whereby a film intermediate may be formed.

As a method for imidizing the precursor composition, a conventionally known method may be used. Examples of the conventionally known method may include a thermal imidizing method, a chemical imidizing method, or a composite imidizing method using the thermal imidizing method and the chemical imidizing method in combination.

The thermal imidizing method is a method in which an imidizing reaction proceeds only by heating without using a dehydrating/ring-closing agent or the like. The thermal imidizing method is a method in which a polyimide film having a imidized polyamic acid is obtained by gradually increasing a temperature in a predetermined temperature range after casting a polyamic acid on a support body.

The chemical imidizing method is a method of accelerating imidization by causing a chemical conversion agent and/or an imidizing catalyst to act on a precursor composition.

The composite imidizing method is a method in which a polyimide film is obtained by adding a dehydrating agent and an imidizing catalyst to a precursor composition, casting the precursor composition on a support body, heating the precursor composition at a predetermined temperature to activate the dehydrating agent and the imidizing catalyst, partially curing and drying the precursor composition, and then heating the precursor composition again.

In the present disclosure, the polyimide film may be prepared by appropriately selecting one of the imidizing methods described above. The following description will be made under the assumption that the most commonly used chemical imidizing method is used.

In order to prepare the polyimide film, a chemical conversion agent and/or an imidizing catalyst may be first mixed into a precursor composition at a low temperature.

The chemical conversion agent and the imidizing catalyst are not particularly limited. For example, beta-picoline, acetic anhydride, dibasic calcium phosphate and the like may be used.

Meanwhile, the precursor composition is cast in a film form on a support body such as a glass plate, an aluminum foil, an endless stainless steel belt, a stainless steel drum or the like. Thereafter, the precursor composition on the support body is heated in a temperature range of 150 degrees C. to 200 degrees C. By doing so, the chemical conversion agent and the imidizing catalyst are activated. Partial curing and/or drying occur, thereby forming an intermediate in a pre-filming step. Thereafter, the film is peeled from the support body to obtain a film intermediate.

Since the film intermediate thus obtained is imidized at a relatively low temperature, it may have a self-supporting property and may be in the form of a gel favorable for stretching.

iii) Condition (c)

The film intermediate may be stretched to adjust the thickness and size of the polyimide film prepared therefrom and to improve the orientation. At this time, the stretching may be performed in at least one of a machine direction (MD) and a transverse direction (TD) with respect to the machine direction.

When the film intermediate is stretched in the machine direction, the molecular orientation may follow the machine direction so that the orientation of the polyimide film may be improved. However, when the stretching of the film intermediate is carried out for the purpose of orientation in any one direction, for example, orientation in the machine direction, shrinkage in the transverse direction, which is the other direction, may be accompanied. Thus, the stretching direction and stretching ratio should be carefully selected.

Therefore, in the present disclosure, the stretching ratio in at least one of the machine direction and the transverse direction may be +3% or more and +25% or less. Specifically, the stretching ratio in both the machine direction and the transverse direction may be +3% or more and +25% or less.

In addition, the film intermediate may be stretched so that the polyimide film has a thickness of from 20 micrometers to 125 micrometers.

When the thickness of the polyimide film is less than the above-mentioned range, it is not preferable in that an excessively thin graphite sheet may be obtained. When the thickness of the polyimide film exceeds the above-mentioned range, the thermal energy for preparing a graphite sheet may be excessively consumed, and the graphitized form may be different in the surface of the polyimide film and the inside of the polyimide film, which is undesirable.

In the meantime, the film intermediate partially imidized together with the stretching may be further heat-treated to completely imidize the film intermediate. The heat treatment for the complete imidization may be performed at 250 degrees C. to 850 degrees C. for 5 to 25 minutes.

Method for Preparing a Graphite Sheet

The method for preparing a graphite sheet according to the present disclosure may include: preparing a polyimide film having a value of the following Formula 1 which is less than 0.4; carbonizing the polyimide film; and obtaining a graphite sheet by graphitizing the carbonized polyimide film, wherein the graphite sheet has a thermal conductivity of 1400 W/m·K or more.

$$(\text{first FWHM} - \text{second FWHM})/(\text{first FWHM} + \text{second FWHM}) \quad \text{Formula 1}$$

In this regard, the definitions of the first FWHM and the second FWHM are the same as those described in the preceding embodiment of the polyimide film.

The method for preparing a graphite sheet of the present disclosure has been made by noting the fact that among the crystal planes of the polyimide film as a raw material for preparation, in particular, the diffraction peak of (010) plane and the diffraction peak of (102) plane are related to the orientation of the film.

When the polyimide film has a specific value of Formula 1 for the relationship between FWHMs of the diffraction peaks, the graphite sheet prepared therefrom may exhibit a considerably high thermal conductivity of 1400 W/m·K or more, specifically 1500 W/m·K or more.

Presumably, this is because the carbon rearrangement is relatively advantageous in the carbonization process of the polyimide film when the value of Formula 1 falls within the specific numerical value range of the present disclosure, specifically less than 0.4, as described above. Assuming that the graphitization proceeds almost simultaneously in the surface layer and the inside of the polyimide film, the polyimide film according to the present disclosure satisfying the above numerical value range has the orientation characteristic suitable for conversion into a graphite sheet. Thus, it is expected that the polyimide film has suitable orientation which assists in forming a graphite structure having a high level of thermal conductivity both in the surface layer and the inside of the polyimide film and in suppressing a phenomenon that a gas generated from the inside of the polyimide film destroys the graphite structure formed in the surface layer.

In one specific embodiment, the value of Formula 1 may fall within a numerical value range 0.01 or more and 0.37 or less, more specifically 0.02 or more and 0.16 or less, particularly specifically 0.03 or more and 0.09 or less.

In one embodiment, the first FWHM may be 35 degrees or more and 80 degrees or less. The second FWHM may be a value of 43% or more and 92% or less, more specifically a value of 49% or more and 92% or less, with respect to the first FWHM.

The obtaining the graphite sheet may include carbonizing the polyimide film and graphitizing the carbonized film.

The carbonizing the polyimide film may be performed using a hot press and/or an electric furnace under a reduced pressure or in a nitrogen gas. In the present disclosure, the carbonizing the polyimide film may be carried out at a temperature of about 1,000 degrees C. to 1,500 degrees C. for about 1 hour to 5 hours.

In some cases, a pressure may be applied in a vertical direction using a hot press for carbon orientation in a desired form. In this case, a pressure of 5 kg/cm$^2$ or more, specifically 15 kg/cm$^2$ or more, more specifically 25 kg/cm$^2$ or more may be applied during the carbonizing process. However, this is nothing more than an example for helping to carry out the present disclosure, and the above pressure condition does not limit the scope of the present disclosure.

Subsequently, the graphitizing the carbonized polyimide film may be performed.

The graphitizing the carbonized polyimide film may also be performed using a hot press and/or an electric furnace. The graphitizing the carbonized polyimide film may also be performed in an inert gas. Preferred examples of the inert gas may include a mixed gas containing argon and a small amount of helium.

The heat treatment temperature in the graphitizing the carbonized polyimide film is required to be at least 2,500 degrees C. or more, and may preferably be 3,000 degrees C. or less in consideration of economy.

In some cases, a pressure of 100 kg/cm$^2$ or more, specifically 200 kg/cm$^2$ or more, more specifically 300 kg/cm$^2$ or more may be applied in the graphitizing the carbonized polyimide film. However, this is nothing more than an example for helping to carry out the present disclosure, and the above pressure condition does not limit the scope of the present disclosure.

In the method for preparing a graphite sheet according to the present disclosure, the preparation of a polyimide film may satisfy the following process conditions (a) to (c):

(a) the viscosity of the precursor composition containing a polyamic acid and an organic solvent is 55,000 cP to 900,000;

(b) a heat treatment for heating and drying the precursor composition after casting the precursor composition is conducted at a temperature of from 150 degrees C. to 200 degrees C.; and (c) a film intermediate prepared by the heat treatment is stretched at least once to prepare the polyimide film.

The significance of the process conditions (a) to (c) may be the same as the conditions (a) to (c) of the polyimide film according to the present disclosure described above.

Specifically, the preparation of a polyimide film may comprises:

preparing the precursor composition, comprising the process condition (a);

forming the film intermediate by heat-treating the precursor composition, comprising the process condition (b); and stretching the film intermediate in at least one of a machine direction and a transverse direction, comprising the process condition (c).

Examples of the method for preparing and polymerizing the precursor composition are as follows.

(1) A method in which the whole amount of diamine monomers is put into a solvent, and then dianhydride monomers are added in a mole substantially equal to the mole of the diamine monomers, thereby performing polymerization.

(2) A method in which the whole amount of dianhydride monomers is put into a solvent, and then diamine monomers are added in a mole substantially equal to the mole of the dianhydride monomers, thereby performing polymerization.

(3) A method in which some of diamine monomers are put into a solvent, some of dianhydride monomers are mixed in a ratio of about 95 to 105 mol % with respect to the reacted diamine monomers, the remaining diamine monomers are added, and then the remaining dianhydride monomers are added so that the total mole of the diamine monomers and the total mole of the dianhydride monomers are substantially equal to each other, thereby performing polymerization.

(4) A method in which some of dianhydride monomers are put into a solvent, some of diamine monomers are mixed in a ratio of about 95 to 105 mol % with respect to the reacted dianhydride monomers, the remaining dianhydride monomers are added, and then the remaining diamine monomers are added so that the total mole of the diamine monomers and the total mole of the dianhydride monomers are substantially equal to each other, thereby performing polymerization.

(5) A method in which a first precursor composition is formed by reacting some of diamine monomers and some of dianhydride monomers in a solvent so that the amount of one of the diamine monomers and the dianhydride monomers becomes excessive, a second precursor composition is formed by reacting some of diamine monomers and some of dianhydride monomers in another solvent so that the amount of one of the diamine monomers and the dianhydride monomers becomes excessive, and then the first precursor composition and the second precursor composition are mixed to perform polymerization, wherein the amount of the dianhydride monomers is made excessive in the second precursor composition when the amount of the diamine monomers is excessive during the formation of the first precursor composition, the amount of the diamine monomers is made excessive in the second precursor composition when the amount of the dianhydride monomers is excessive in the first precursor composition, and the first precursor composition and the second precursor composition are mixed to perform polymerization so that the total mole of the diamine monomers and the total mole of the dianhydride monomers are equal to each other.

However, the precursor composition polymerization method is not limited to the above, and any known methods may be used.

During the polymerization, the weight average molecular weight of the polyamic acid contained in the precursor composition may be 240,000 or more, specifically 260,000 or more, and more specifically, 280,000 or more. The use of the polyimide film prepared from the precursor composition may be advantageous for the preparation of a graphite sheet having an excellent thermal conductivity because carbon chains longer and larger than those when weight average molecular weight is less than 240,000 are polymerized.

The weight average molecular weight in the above range may be controlled by adjusting the viscosity of the precursor composition. Specifically, the weight average molecular weight increases in proportion to the viscosity. However, the weight average molecular weight is not linearly proportional to the viscosity but is proportional to the viscosity in a logarithmic form.

That is, even if the viscosity is increased to obtain a polyamic acid having a higher weight average molecular weight, the range in which the weight average molecular weight can increase is limited. If the viscosity is excessively high, when varnish is discharged through a die in a process of casting for preparing a polyimide film, a problem of workability may be caused due to an increase in the pressure inside the die or the like.

Thus, the precursor composition may be prepared by mixing the polyamic acid in an amount of 15 to 20% by weight and the organic solvent in an amount of 80 to 85% by weight based on the total weight of the precursor composition. The weight average molecular weight in the above range may be achieved by controlling the viscosity in this range.

In this case, the content of the polyamic acid corresponds to the total amount of the dianhydride monomers and the diamine monomers used in the reaction. The content of the polyamic acid may be referred to as "the solid content of the polyamic acid" present in the precursor composition.

A more preferred range of the viscosity may be 90,000 cP to 300,000 cP, more preferably 100,000 cP to 250,000 cP.

The dianhydride monomers, the diamine monomers and the organic solvent may be optionally used in the examples described above.

In the process of preparing the film intermediate by heat-treating the precursor composition, after casting the precursor composition on a support body, as the precursor composition is subjected to a heat treatment at a predetermined temperature conforming to the condition (b), the polyamic acid may be partially cyclized and dehydrated to form imide rings, whereby a film intermediate may be formed.

As the method for imidizing the precursor composition, a conventionally known method may be used. Examples of the conventionally known method may include a thermal imidizing method, a chemical imidizing method, or a composite imidizing method using the thermal imidizing method and the chemical imidizing method in combination. These methods are the same as described above and, therefore, will not be described again.

The stretching the film intermediate is performed to adjust the thickness and size of the polyimide film and to improve the orientation by stretching the film intermediate. The film intermediate may be stretched at a temperature of 20 to 40 degrees C. so as to have a thickness of 20 to 125 micrometers. In this case, the stretching ratio in at least one of the machine direction and the transverse direction may be +3% or more and +25% or less. Specifically, the stretching ratio in both the machine direction and the transverse direction may be between +3% or more and +25% or less.

Graphite Sheet

The present disclosure provides a graphite sheet prepared from the polyimide film, or a graphite sheet prepared by the above preparation method.

The graphite sheet may have a thermal conductivity of 1400 W/m·K or more, specifically 1500 W/m·K or more. Accordingly, when the graphite sheet is used as a heat dissipating means of an electronic device, the graphite sheet may accelerate heat dissipation and may significantly contribute to the improvement of performance improvement of an electronic device.

The graphite sheet may have a thickness of 15 μm to 60 μm.

If the thickness of the graphite sheet is out of the above range and is too thin or too thick, a desired range of thermal conductivity may not be exhibited. Furthermore, the handling and molding of the graphite sheet may not be easy in the process of applying the graphite sheet to a desired electronic device or the like.

The present disclosure also provides an electronic device including the high performance graphite sheet described above. The specific kind, configuration and structure of the electronic device are well known in the art. Therefore, detailed description thereof will be omitted.

The present disclosure has been specifically described above to indicate that the relationship between FWHMs of diffraction peaks according to the XRD analysis of a polyimide film and the thermal conductivity of a graphite sheet prepared from the polyimide film are significantly related to each other.

In summary, a value of Formula 1 which can quantitatively establish the relationship between FWHMs of diffraction peaks on a (010) plane and (102) plane of a polyimide film may be used to improve the thermal conductivity of a graphite sheet. Thus, in the polyimide film of the present disclosure, the value of Formula 1 may be less than 0.4, specifically 0.01 to 0.37, more specifically 0.02 to 0.16, even more specifically 0.03 to 0.09.

Accordingly, the polyimide film and the method for preparing the graphite sheet using the same may make it possible to realize a graphite sheet having a high thermal conductivity.

In addition, the graphite sheet prepared according to the method for preparing the graphite sheet of the present disclosure has a thermal conductivity of 1400 W/m·K or more, specifically 1500 W/m·K or more. Thus, the graphite sheet may remarkably improve the performance of an electronic device based on the extremely high thermal conductivity.

DETAILED DESCRIPTION

Figure 1:
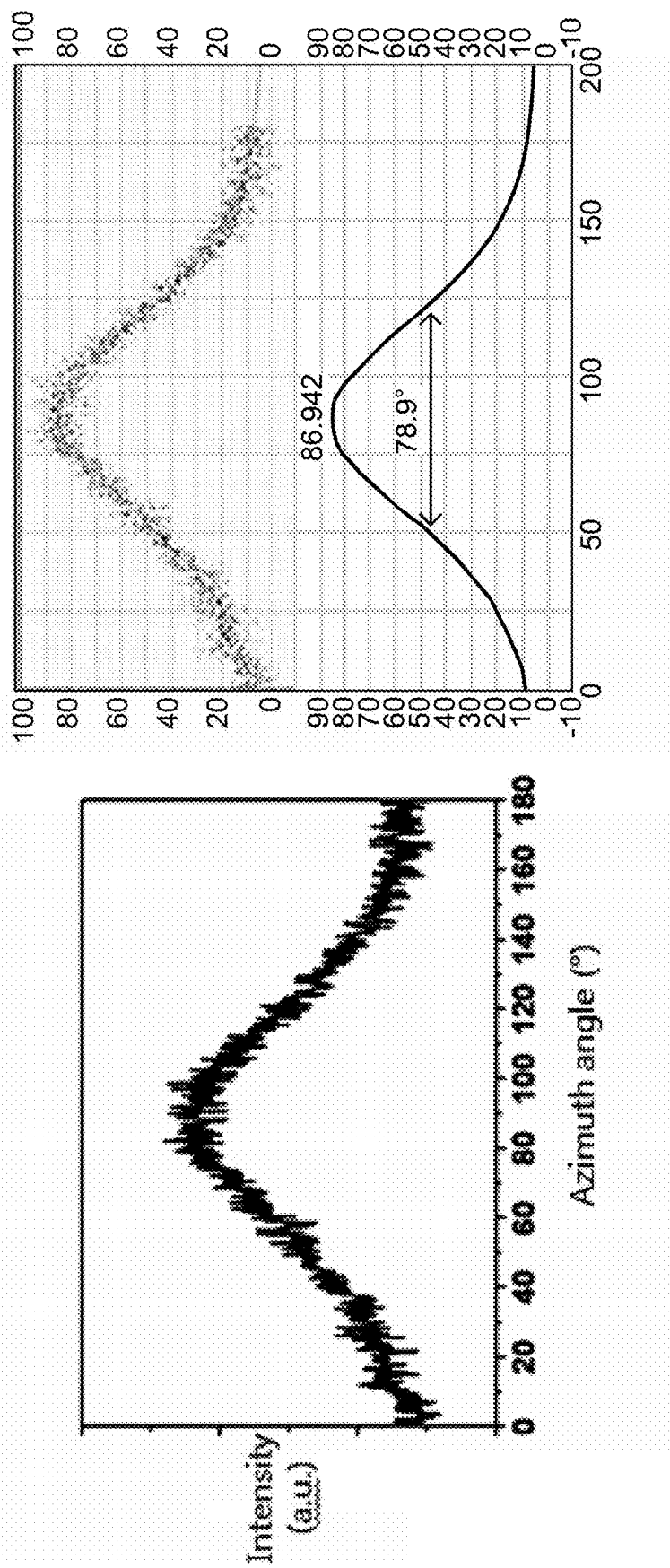
FIG. 1 is a graph showing the XRD result for a (010) plane of a polyimide film according to example 1.

Hereinafter, the action and effect of the present disclosure will be described in more detail through specific examples of the present disclosure. It is to be understood, however, that such examples are merely illustrative of the present disclosure and are not intended to limit the scope of the present disclosure.

Preparation Example of Precursor Composition

Preparation Example 1

400 g of dimethylformamide was put into a 0.5 L reactor and the temperature was set to 20 degrees C. Then, 33.79 g of 4,4-diaminodiphenylether was added and dissolved. Thereafter, 35.33 g of pyromellitic dianhydride was added and dissolved. When dissolution was completed, pyromellitic dianhydride was gradually added to the solution, and the viscosity was measured to obtain a varnish of about 100,000 cP. At this time, the polyamic acid solid content is 15% based on the total amount of the precursor composition.

Preparation Example 2

A precursor composition was obtained in the same manner as in preparation example 1 except that a varnish of about 250,000 cP was obtained. At this time, the polyamic acid solid content is 15% based on the total amount of the precursor composition.

Preparation Example 3

A precursor composition was obtained in the same manner as in preparation example 1 except that a varnish of about 400,000 cP was obtained. At this time, the polyamic acid solid content is 15% based on the total amount of the precursor composition.

Preparation Example 4

A precursor composition was obtained in the same manner as in preparation example 1 except that a varnish of about 500,000 cP was obtained. At this time, the polyamic acid solid content is 15% based on the total amount of the precursor composition.

Preparation Example 5

A precursor composition was obtained in the same manner as in preparation example 1 except that a varnish of about 500,000 cP was obtained and polymerization was performed so that the polyamic acid solid content is 20% based on the total amount of the precursor composition.

Preparation Example 6

A precursor composition was obtained in the same manner as in preparation example 1 except that a varnish of about 900,000 cP was obtained and polymerization was performed so that the polyamic acid solid content is 15% based on the total amount of the precursor composition.

Preparation Example 7

A precursor composition was obtained in the same manner as in preparation example 1 except that a varnish of about 30,000 cP was obtained and polymerization was performed so that the polyamic acid solid content is 15% based on the total amount of the precursor composition.

Preparation Example 8

A precursor composition was obtained in the same manner as in preparation example 1 except that a varnish of about 30,000 cP was obtained and polymerization was performed so that the polyamic acid solid content is 10% based on the total amount of the precursor composition.

Preparation Example 9

A precursor composition was obtained in the same manner as in preparation example 1 except that a varnish of about 30,000 cP was obtained and polymerization was performed so that the polyamic acid solid content is 25% based on the total amount of the precursor composition.

EXAMPLE

Example 1

4.5 g of beta-picoline (boiling point: 144 degrees C.) as an imide curing catalyst, 17.0 g of acetic anhydride as a dehydrating agent and 23.5 g of dimethylformamide as a polar organic solvent were mixed and stirred in 100 g of the precursor composition obtained in preparation example 1. After mixing 45 g of imide conversion liquid with the solution, thus obtained, the solution was cast on a stainless steel plate and was dried in a 150 degrees C. oven for 4 minutes with a hot air. Thereafter, the film thus obtained was stretched by +3% in the machine direction and the transverse direction, respectively, at a temperature of 20 degrees C. to obtain a polyimide film.

Example 2

A polyimide film was obtained in the same manner as in example 1 except that the precursor composition obtained in preparation example 2 was used.

Example 3

A polyimide film was obtained in the same manner as in example 1 except that the precursor composition obtained in preparation example 3 was used.

Example 4

A polyimide film was obtained in the same manner as in example 1 except that the precursor composition obtained in preparation example 4 was used.

Example 5

A polyimide film was obtained in the same manner as in example 1 except that the precursor composition obtained in preparation example 5 was used.

Example 6

A polyimide film was obtained in the same manner as in example 1 except that the precursor composition obtained in preparation example 2 was used and the film was stretched by +25% in the machine direction and the transverse direction, respectively.

Example 7

A polyimide film was obtained in the same manner as in example 1 except that the precursor composition obtained in preparation example 6 was used.

Comparative Example 1

A polyimide film was obtained in the same manner as in example 1 except that the precursor composition obtained in preparation example 7 was used.

Comparative Example 2

A polyimide film was obtained in the same manner as in example 1 except that the precursor composition obtained in preparation example 8 was used.

Comparative Example 3

A polyimide film was obtained in the same manner as in example 1 except that the precursor composition obtained in preparation example 9 was used.

Comparative Example 4

A polyimide film was obtained in the same manner as in example 1 except that the film was stretched by +50% in the machine direction and the transverse direction, respectively.

Experimental Example 1: Evaluation of Morphological Stability of Polyimide Film In the polyimide films obtained in example 1 and comparative example 4, the degree of shrinkage in the transverse direction which occurs when stretching in the machine direction was evaluated.

In the evaluation, the film width before stretching was measured and the film width after stretching was measured to calculate a shrinkage percentage. The shrinkage percentage in the transverse direction (TD) as a result is shown in Table 1 below. The breakage of the film was visually confirmed, and the result is also shown in Table 1.

TABLE 1

|  | TD shrinkage percentage (%) | Breakage |
| --- | --- | --- |
| Example 1 | 1 | X |
| Comparative Example 4 | 18 | ○ (film broken) |

Referring to Table 1, it can be seen that the polyimide film according to example 1 has a small shrinkage percentage in the transverse direction caused by the stretching in the machine direction. As a result, it can be noted that there is no problem such as breakage in the transverse direction stretching performed after the machine direction stretching.

Accordingly, the polyimide film according to example 1 has an advantage of improving the orientation by proper stretching and does not show any apparent breakage. Thus, the polyimide film can be used for the preparation of a graphite sheet. As a result, it is expected that a graphite sheet having excellent physical properties can be prepared.

On the other hand, in the case of comparative example 4 in which the stretching in the machine direction was excessively performed, it can be noted that the transverse direction shrinkage percentage increases at the time of machine direction stretching, and the film is broken at the time of performing the transverse direction stretching again.

This indicates that if the polyimide film is excessively stretched beyond the stretching range of the present disclosure, severe damage to the outer appearance may occur, making it impossible to prepare a graphite sheet.

Experimental Example 2: Evaluation of Physical Properties of Polyimide Film

X-ray diffraction (XRD) analysis was performed on the polyimide films obtained in examples 1 to 6 and comparative examples 1 to 3 to measure the diffraction intensities with respect to the azimuthal angles on the crystal planes (010) and (102). Detailed conditions related to the XRD analysis are as follows.

- Light source: flexural magnet synchrotron/6D UNIST-PAL beam line (Pohang radiation accelerator)
- Energy used: 18.986 keV (wavelength: 0.653 Å)
- Light source size: 100 (H)×40 (V) um$^2$
- X-ray exposure time: 60 to 240 seconds
- Detector: Rayonix MX225-HS (2880×2880 pixels, pixel size: 78 um)

Based on this, a first FWHM of (010) plane and a second FWHM of (102) plane were measured, and a value of the following Formula 1 was calculated using the first FWHM and the second FWHM. The results are shown in Table 2.

(first FWHM−second FWHM)/(first FWHM+second FWHM)　　Formula 1

TABLE 2

|  | First FWHM (degrees) | Second FWHM (degrees) | Calculated value |
| --- | --- | --- | --- |
| Example 1 | 78.9 | 36.6 | 0.37 |
| Example 2 | 55.8 | 37.2 | 0.20 |
| Example 3 | 59.0 | 43.9 | 0.15 |
| Example 4 | 53.1 | 41.9 | 0.12 |
| Example 5 | 57.9 | 41.1 | 0.17 |
| Example 6 | 44.3 | 38.3 | 0.07 |
| Example 7 | 65.1 | 59.6 | 0.04 |
| Comparative example 1 | 85.4 | 35.1 | 0.42 |
| Comparative example 2 | 84.5 | 33.1 | 0.44 |
| Comparative example 3 | 88.5 | 34.0 | 0.44 |

As a result of the XRD analysis, it was confirmed that the polyimide films according to examples 1 to 6 have the value of Formula 1 which falls within the specific numerical value range according to the present disclosure, i.e., less than 0.4, and the polyimide films according to the comparative examples has the value of Formula 1 which falls outside the specific numerical value range according to the present disclosure.

Meanwhile, FIG. 1 shows an XRD analysis graph of (010) plane of the polyimide film according to example 1. Referring to FIG. 1, the difference between the maximum azimuth angle and the minimum azimuth angle at (010) plane diffraction intensity of 50% can be calculated as a FWHM. The FWHM of the diffraction peak may be the first FWHM for (010) plane, the value of which is 78.9 degrees.

Figure 2:
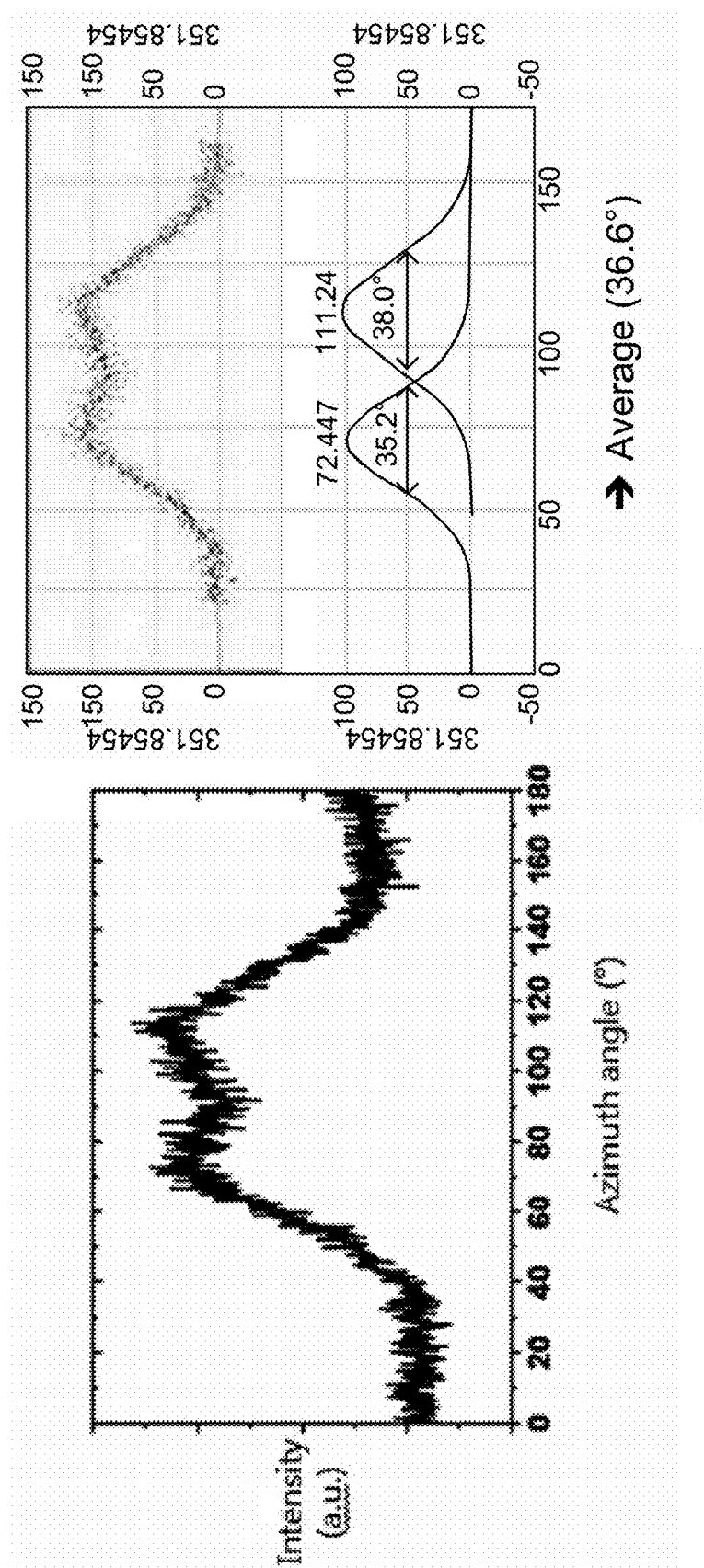
FIG. 2 is a graph showing the XRD result for (102) plane of a polyimide film according to example 1.

FIG. 2 shows an XRD analysis graph of (102) plane of the polyimide film according to example 1.

It can be noted that the diffraction peak of (102) plane is also has a form in which a plurality of peaks are superimposed. The plurality of peaks may be separated into individual peaks by calculation.

In each of the separated diffraction peaks, the difference between the maximum azimuth angle and the minimum azimuth angle at the diffraction intensity of 50% can be calculated as a FWHM. The average of the FWHMs of the diffraction peaks may be the second FWHM for (102) plane, the value of which is 36.6 degrees.

Experimental Example 3: Evaluation of Physical Properties of Graphite Sheet

The polyimide films obtained in examples 1 to 6 and comparative examples 1 to 3 were heated to 1,200 degrees C. at a rate of 1 degree C./min under the presence of a nitrogen gas using an electric furnace capable of carbonization and were maintained for about 2 hours (carbonization). Then, the polyimide films were heated to 2,800 degrees C. at a rate of 20 degree C./min under the presence of an argon gas using an electric furnace and were maintained for about 8 hours. Then, the polyimide films were cooled to obtain graphite sheets.

The thermal diffusivity of each of the graphite sheets was measured by a laser flash method using a thermal diffusivity measuring instrument (Model LFA 447, Netzsch Korea co., ltd.). The thermal diffusivity thus measured was multiplied by the density (weight/volume) and the specific heat (theoretical value: 0.85 kJ/kg·K) to calculate the thermal conductivity. The results are shown in Table 3 below.

TABLE 3

|  | Thermal diffusivity (m²/s) | Thermal conductivity (W/m · K) |
|---|---|---|
| Example 1 | 782.5 | 1410 |
| Example 2 | 781.7 | 1422 |
| Example 3 | 813.6 | 1473 |
| Example 4 | 825.2 | 1487 |
| Example 5 | 811.2 | 1441 |
| Example 6 | 841.4 | 1531 |
| Example 7 | 873.9 | 1560 |
| Comparative example 1 | 706.4 | 1315 |
| Comparative example 2 | 767.3 | 1350 |
| Comparative example 3 | 702.6 | 1284 |

From the results shown in Table 3, it can be seen that the graphite sheets prepared from the polyimide films of the examples has significantly high thermal conductivity and thermal diffusivity as compared with those of the comparative examples.

This clearly indicates that the polyimide films having the value of Formula 1 which falls within the specific numerical value range according to the present disclosure are capable of realizing excellent thermal conductivity, and further that the polyimide films having the value of Formula 1 which falls outside the specific numerical value range according to the present disclosure cannot realize graphite sheets having a desired thermal conductivity.

In another aspect, the relationship between the first FWHM and the second FWHM can be quantitatively calculated using the value of Formula 1. The results shown in Tables 2 and 3 prove and indicate that the thermal conductivity of the graphite sheet can be predicted using the quantitative values for the relationship between the FWHMs.

While the present disclosure has been described with reference to the embodiments, it is to be understood that various changes and modifications may be made without departing from the spirit and scope of the present disclosure.

What is claimed is:

1. A polyimide film prepared from a precursor composition containing a polyamic acid and an organic solvent and having a value of the following Formula 1 less than 0.4:

$$(\text{first FWHM} - \text{second FWHM})/(\text{first FWHM} + \text{second FWHM}) \quad \text{Formula 1}$$

wherein, when a diffraction peak of (010) plane according to XRD analysis of the polyimide film is in the form of a single peak, the first FWHM (full width at half maximum) indicates a FWHM of the single peak; and when the diffraction peak of (010) plane is in the form of a plurality of single peaks or in the form of a plurality of single peaks overlapped with each other, the first FWHM indicates an average of individual FWHMs of the single peaks, and when a diffraction peak of (102) plane according to XRD analysis of the polyimide film is in the form of a single peak, the second FWHM indicates a FWHM of the single peak; and when the diffraction peak of (102) plane is in the form of a plurality of single peaks or in the form of a plurality of single peaks overlapped with each other, the second FWHM indicates an average of individual FWHMs of the single peaks, wherein the polyamic acid is contained in an amount 15 to 20% by weight based on the total weight of the precursor composition, and a film intermediate derived from the precursor composition is stretched at least once, wherein the film intermediate is stretched at a temperature of 20 degrees C. to 40 degrees C.

2. The polyimide film of claim 1, wherein the film intermediate is stretched so that the polyimide film has a thickness of 20 to 125 micrometers.

3. The polyimide film of claim 1, wherein a stretching ratio in the at least one of the machine direction and the transverse direction is +3% or more and +25% or less.

4. The polyimide film of claim 1, wherein the polyamic acid is prepared by polymerization of dianhydride monomers and diamine monomers.

5. The polyimide film of claim 1, wherein the first FWHM is 35 degrees or more and 80 degrees or less, and the second FWHM is 43% or more and 92% or less of the first FWHM.

6. The polyimide film of claim 1, wherein the value of Formula 1 is 0.01 or more and 0.37 or less.

7. A method for preparing a graphite sheet, comprising:
preparing a polyimide film having a value of the following Formula 1 less than 0.4 from a precursor composition containing a polyamic acid and an organic solvent;
carbonizing the polyimide film; and
obtaining a graphite sheet by graphitizing the carbonized polyimide film, wherein the graphite sheet has a thermal conductivity of 1400 W/mK or more:

$$(\text{first FWHM} - \text{second FWHM})/(\text{first FWHM} + \text{second FWHM}) \quad \text{Formula 1}$$

wherein, when a diffraction peak of (010) plane according to XRD analysis of the polyimide film is in the form of a single peak, the first FWHM (full width at half maximum) indicates a FWHM of the single peak; and when the diffraction peak of (010) plane is in the form of a plurality of single peaks or in the form of a plurality of single peaks overlapped with each other, the first FWHM indicates an average of individual FWHMs of the single peaks, and when a diffraction peak of (102) plane according to XRD analysis of the polyimide film is in the form of a single peak, the second FWHM indicates a FWHM of the single peak; and when the diffraction peak of (102) plane is in the form of a plurality of single peaks or in the form of a plurality of single peaks overlapped with each other, the second FWHM indicates an average of individual FWHMs of the single peaks, wherein the polyamic acid is contained in an amount 15 to 20% by weight based on the total weight of the precursor composition, and a film intermediate derived from the precursor composition is stretched at least once, wherein the film intermediate is stretched at a temperature of 20 degrees C. to 40 degrees C.

8. The method for preparing a graphite sheet of claim 7, wherein the film intermediate is stretched so that the polyimide film has a thickness of 20 to 125 micrometers.

9. The method for preparing a graphite sheet of claim 7, wherein the film intermediate is stretched at a stretching ratio of +3% or more and +25% or less in at least one of the machine direction and the transverse direction.

10. The method for preparing a graphite sheet of claim 7, wherein the precursor composition is prepared by mixing the polyamic acid in an amount of 15 to 20% by weight and the organic solvent in an amount of 80 to 85% by weight based on the total weight of the precursor composition.

11. The method for preparing a graphite sheet of claim 7, wherein the polyamic acid is prepared by polymerization of dianhydride monomers and diamine monomers.

12. The method for preparing a graphite sheet of claim 7, wherein the first FWHM is 35 degrees or more and 80 degrees or less, and the second FWHM is 43% or more and 92% or less of the first FWHM.

13. The method for preparing a graphite sheet of claim 7, wherein the value of Formula 1 is 0.01 or more and 0.37 or less.

14. The method for preparing a graphite sheet of claim 7, wherein the polyimide film is carbonized by heat-treating the polyimide film at a temperature of 1,000 degrees C. to 1,500 degrees C.

15. The method for preparing a graphite sheet of claim 7, wherein the carbonized polyimide film is graphitized by heat-treating the carbonized polyimide film at a temperature of 2,500 degrees C. to 3,000 degrees C.

* * * * *